United States Patent Office 3,730,767

Patented May 1, 1973

3,730,767

UNDERCOATING COMPOSITION FOR A MAGNETIC RECORDING MEDIUM

Goro Akashi, Masaaki Fujiyama, and Tokuaki Miyake, Odawara, Japan, assignors to Fuji Photo Film Co., Ltd., Kanagawa, Japan No Drawing. Continuation-in-part of application Ser. No. 739,172, June 24, 1968. This application Apr. 22, 1971, Ser. No. 136,585

Claims priority, application Japan, June 24, 1967, 42/40,398

Int. Cl. B32b *27/36;* C08g *39/10;* G11b *5/70*

U.S. Cl. 117—239 8 Claims

ABSTRACT OF THE DISCLOSURE

An undercoating composition for bonding a magnetic recording layer, to a support composed of an amorphous polyester and a polycarbonate and a method for forming a magnetic recording device using said undercoating composition and a magnetic recording device resulting from said method are disclosed.

CROSS-REFERENCE TO RELATED APPLICATIONS

This is a continuation-in-part application of co-pending application Ser. No. 739,172, filed June 24, 1968 and now abandoned.

BACKGROUND OF THE INVENTION

(1) Field of the invention

This invention relates to a magnetic recording medium, and more particularly to an undercoating composition which is capable of firmly bonding a magnetic recording layer to a support without causing blocking.

(2) Description of the prior art

Magnetic recording media now in common use is usually composed of a support to which an undercoat is applied, and a magnetic recording layer provided thereon consisting of a magnetic material, such as finely divided magnetic iron oxide or chromium dioxide dispersed in a binder. The binder usually consists of polymeric resinous material dissolved in a suitable solvent. The magnetic recording layer is applied to the support in liquid form, after which the solvent is evaporated to leave a dry coating. In general, the magnetic recording media thus produced is formed in a variety of forms such as tapes, discs, or square sheets depending on the particular magnetic recorder system. To support the magnetic recording media, when the media is on a tape-like form, flexible non-magnetic materials, such as triacetyl cellulose, diacetate cellulose, polyethylene terephthalate, polyvinyl chloride, and the like, have been used. When the media is in a disc- or square sheet form, comparatively hard non-magnetic materials, such as plastic sheet, metallic sheet or plate has been used. The magnetic recording layer normally comprises a composition of about 30 to about 40% by volume of magnetic powders with about 60 to about 70% by volume of a binder such as polyvinyl acetate, a copolymer of vinyl chloride and vinyl acetate, or an epoxy resin, and suitable additives for improving its processing properties or use properties.

However, ordinary thicknesses of these conventional magnetic layers are very poor in mechanical strength rendering them easily broken. Moreover, it is very difficult to firmly bond such magnetic recording layers to the support. Heretofore, there has generally been used an undercoating composition to bind the magnetic recording layer to the support which was similar to the types commonly used in painting. Normally, low-polymer resins such as polyvinyl acetate and a vinyl chloride-vinyl acetate copolymer have been used as the undercoating composition. In order to improve the adhesive property of the undercoat to the support, the surface of the support is sand-blasted or etched with a solvent to increase its surface area.

However, this type of undercoating composition has proved to be inadequate in adhesive strength for many types of supports and particularly supports such as polyethylene terephthalate or "Mylar" (trade name by E. I. du Pont de Nemours & Co., Inc.).

Accordingly, it is an object of this invention to provide a magnetic recording medium with an improved undercoat having good adhesive strength between the magnetic recording layer and the support.

Another object of this invention is to provide a magnetic recording medium having an improved undercoat for firmly bonding a magnetic recording layer to a polyethylene terephthalate support.

Still another object of this invention is to provide a magnetic recording medium with reduced blocking.

SUMMARY OF THE INVENTION

According to the present invention, there is provided a magnetic recording medium composed of a support, an undercoat provided on the support, and a magnetic recording layer formed on the undercoat in which said undercoating composition comprises an amorphous polyester and between about 1–25% by weight, based on said polyester, of a polycarbonate resin.

DETAILED DESCRIPTION OF PREFERRED EMBODIMENTS

Suitable polyesters which can be used in the undercoating composition of the invention are conventional polyesters which are polymers of a dicarboxylic acid such as terephthalic acid and a polyhydroxy alcohol, such as ethylene glycol, triethylene glycol and mixtures thereof, for example, an interpolymer of terephthalic acid and ethylene glycol or triethylene glycol.

Suitable polycarbonates which can be used in the undercoating composition of this invention are commercially available polycarbonates such as those having the general formula

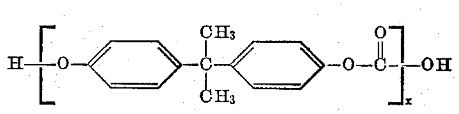

wherein X represents the number of repeating units, with the polycarbonates being formed, for example by the reaction of bisphenol A and phosgene.

According to this invention, the magnetic recording medium may be in the form of a tape, square-sheet or disc, and more particularly may be in the form of a conventional video tape, an audio tape, a memory tape, a magnetic recording disc or a sheet.

This invention will now be further explained by reference to the following examples.

EXAMPLE 1

(Control example)

A mixture of about 37% iron oxide powders and about 63% by volume vinyl chloride-vinyl acetate copolymer was dispersed in a solvent mixture of methyl isobutyl ketone and toluene and the dispersion was applied to a Mylar base of about 25 microns in thickness in a dry thickness of 12 microns without forming an undercoat on the support.

EXAMPLE 2

(Control example)

A coating composition having the following composition was applied to a Mylar base having a thickness of about 25 microns in a dry thickness of 0.7 micron and thereafter a dispersion of magnetic powders having the same composition as in Example 1 was applied to the undercoat thus formed in a dry thickness of 12 microns.

Composition A: Polyvinyl acetate having about 250 in polymerization degree was dissolved in methyl acetate in a concentration of 7%;

Composition B: A vinyl chloride-vinyl acetate copolymer having polymerization degree of about 450 was dissolved in methyl acetate in a concentration of 7%; and Composition C: Composition A was mixed with Composition B in a mixing ratio of 1:3.

For testing the adhesive property of the magnetic layers to the supports in the magnetic recording media prepared in Examples 1 and 2, an adhesive tape was adhered firmly to the surface of the magnetic recording layer and thereafter the tape was pulled, whereby the extent or area of the magnetic recording layer bonded to the support and the tape was measured.

The results show that in the magnetic recording medium prepared in Example 1, about 95% of the magnetic recording layer was transferred to the adhesive tape and in Example 2, 65%, 45% and 40% of the magnetic recording layers were transferred to the adhesive tape in the magnetic recording media prepared using Composition A, Composition B, and Composition C, respectively, as undercoats.

As shown above, when no undercoat was used, the magnetic recording layer was very weakly bonded to the support. Furthermore, even where the aforesaid conventional undercoat was present, the adhesive property of the magnetic recording layer to the support was insufficient as is clear from the results of Example 2.

EXAMPLE 3

(Control example)

An amorphous polyester resin (polyethylene-triethylene terephthalate) having a softening point of 76° C. was dissolved in methylene chloride in a concentration of 5% and the solution was applied to a Mylar base having a thickness of 25 microns in a dry thickness of 0.7 micron. Thereafter, a magnetic powder dispersion having the same composition as in Example 1 was applied to the undercoat in a dry thickness of 12 microns.

EXAMPLE 4

A mixture of an amorphous polyester resin, a copolymer of terephthalic acid, ethylene glycol, and triethylene glycol, and 0% (no addition), 1%, 3%, 5%, 10%, 25%, or 50% by weight of a polycarbonate resin was dissolved in methylene chloride in a solid concentration of 5% and the resulting solution was applied to a Mylar base having a thickness of 25 microns in a dry thickness of 0.7 micron and thereafter, a magnetic powder dispersion having the same composition as in Example 1 was applied to the surface of the undercoat thus formed in a thickness of 12 microns.

The magnetic recording tapes prepared in Examples 3 and 4 were measured for their adhesive properties in the same manner as described in Examples 1 and 2. The results show that the area of the magnetic recording layer transferred to the adhesive tape was less than 1.5% of the whole area of the layer in Example 3 while in the magnetic recording media prepared as in Example 4, the adhesive property of the magnetic layer varied according to the content of polycarbonate. The relationship between the content of polycarbonate and the adhesive properties of the magnetic layer are shown in the following table.

TABLE 1

| Content (wt. percent) of polycarbonate percent: | Adhesive property (area transferred to tape), percent |
|---|---|
| 0 | <1.5 |
| 1 | <1.5 |
| 3 | <1.5 |
| 5 | 2 |
| 10 | 1.5 |
| 25 | 3 |
| 50 | 12 |

That is, as is clear from the above results, the variation of the content of the polycarbonate did not greatly influence the adhesive property when the content was less than 10% but the adhesive property was lowered drastically as the content of polycarbonate was increased to over 50%. The acceptable range of the content of the polycarbonate is therefore less than 25% by weight.

Further, a magnetic recording layer is not always applied directly after the application of an undercoat, frequently the magnetic layer is applied several months after the application of the undercoat. In this case, blocking of the undercoat usually occurs. The occurrence of the blocking phenomenon was also tested with the compositions prepared as in Examples 3 and 4. That is, the undercoated supports having no magnetic recording layers prepared in Examples 3 and 4 were stored in the form of rolls and thereafter the blocking was tested. Since it is known that the occurrence of the blocking phenomenon depends on the temperature at which the roll is stored when the tape is rolled up at a constant rolling force, blocking tends to increase with temperature, the measure of the occurrence of blocking was shown by the temperature at which the blocking phenomenon was observed in the test.

When the sample prepared in Example 3 was cut into 1 cm. in width, rolled to a tension of 150 g., held for 24 hours at 30° C., and then unrolled, a blocking phenomenon was observed. When the support was additionally held for 24 hours at 35° C., it was completely impossible to unroll the support to its initial state.

On the other hand, the occurrence of blocking in the present invention depends on the content of the polycarbonate. When the content of polycarbonate was 0, the results were the same as in Example 3 but when the content of polycarbonate was 1%, there was noted only a slight degree of blocking after 24 hours at 30° C. When the content of the polycarbonate was higher than 5%, no blocking was observed. Moreover, when the content was higher than 10%, no blocking was observed even when the support was held for 24 hours at 40° C.

Thus, it is clear that 1–25% polycarbonate resin is incorporated in amorphous polyester and provides an excellent undercoat for magnetic recording media by providing an excellent adhesive to bond the magnetic layer to the support. Moreover, using the composition of this invention, blocking can be effectively prevented.

What is claimed is:

1. An undercoating composition for bonding a magnetic recording layer to a support which consists essentially of the admixture of an amorphous polyester and from about 1–25% by weight, based on the weight of the polyester, of a polycarbonate, said amorphous polyester being a polycarboxylic acid-polyhydric alcohol condensation product and said polycarbonate being represented by the general formula:

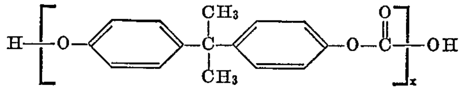

wherein X represents the number of repeating units.

2. The undercoating composition of claim 1, wherein said amorphous polyester is an interpolymer of terephthalic acid and a glycol selected from the group consisting of ethylene glycol and triethylene glycol and mixtures thereof.

3. In a magnetic recording medium comprising a support, a magnetic recording layer on said support and an undercoating composition binding such support to said magnetic recording layer, the improvement comprising said undercoating composition which consists essentially of the admixture of an amorphous polyester and from about 1–25% by weight, based on the weight of the polyester, of a polycarbonate, said amorphous polyester being a polycarboxylic acid-polyhydric alcohol condensation product and said polycarbonate being represented by the general formula:

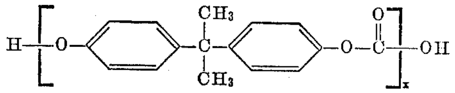

wherein X represents the number of repeating units.

4. The magnetic recording medium of claim 3, wherein said amorphous polyester is an interpolymer of terephthalic acid and a glycol selected from the group consisting of ethylene glycol, triethylene glycol and mixtures thereof.

5. The magnetic recording medium of claim 3, wherein said medium is a magnetic tape.

6. The magnetic recording medium of claim 3, wherein said magnetic recording medium is a magnetic disc.

7. The magnetic recording medium of claim 3, wherein said support comprises polyethylene terephthalate.

8. The magnetic recording medium of claim 3, wherein said polycarbonate is the reaction product of bisphenol A and phosgene.

References Cited

UNITED STATES PATENTS

| | | | |
|---|---|---|---|
| 3,009,847 | 11/1961 | Alles et al. | 154—53.6 |
| 3,218,372 | 11/1965 | Okamura et al. | 260—860 |
| 3,386,935 | 6/1968 | Jackson et al. | 260—26 |
| 3,414,430 | 12/1968 | Maho | 117—71 |
| 2,819,186 | 1/1958 | Franck | 117—239 |
| 3,320,083 | 5/1967 | Rusch | 117—239 |
| 3,325,339 | 5/1967 | McBournie et al. | 117—239 |
| 3,009,847 | 11/1961 | Alles et al. | 156—332 |
| 3,218,372 | 11/1965 | Okamura et al. | 260—860 |
| 3,386,935 | 6/1968 | Jackson et al. | 260—860 |
| 3,414,430 | 12/1968 | Maho | 117—71 |

WILLIAM H. SHORT, Primary Examiner

E. WOODBERRY, Assistant Examiner

U.S. Cl. X.R.

106—37; 117—72, 76; 260—860; 274—41.4